June 16, 1953     J. F. CURRIVAN     2,642,212
TILTING BUCKET BOTTLE LOADER Filed April 7, 1948     7 Sheets-Sheet 1

Fig. 1

Inventor
John F. Currivan
By Strauch & Hoffman
Attorney

June 16, 1953 J. F. CURRIVAN 2,642,212
TILTING BUCKET BOTTLE LOADER
Filed April 7, 1948 7 Sheets-Sheet 3

Inventor
John F. Currivan
By Strauch & Hoffman
Attorneys

Inventor
John F. Currivan
By Strauch & Hoffman
Attorneys

Inventor
John F. Currivan
By Strauch & Hoffman
Attorneys

Patented June 16, 1953

2,642,212

UNITED STATES PATENT OFFICE 2,642,212

TILTING BUCKET BOTTLE LOADER

John Francis Currivan, Dayton, Ohio, assignor, by mesne assignments, to Emhart Manufacturing Company, a corporation of Delaware Application April 7, 1948, Serial No. 19,625

24 Claims. (Cl. 226—2)

This invention relates to devices for automatically transferring or loading containers such as bottles or the like from one conveyor to another and in particular for loading a conveyor having tilting buckets which move from their normal horizontal to an upright position while being loaded.

While the device has other adaptations, it is particularly suited for use in connection with a cartoning machine of the general type shown and described in the application of Alexander H. Ross, Serial Number 731,395, filed February 27, 1947, for Cartoning Machine. In this machine an endless conveyor is provided with "buckets" which carry bottles or the like in a horizontal position and extending transversely of the direction of conveyor movement, there being means to shift the buckets transversely and to eject the bottles from them and insert them into cartons that are traveling in a parallel path.

Before the bottles are placed into the aforesaid buckets for insertion into the cartons they have been filled, capped, and have labels attached. It is desirable that the cartoning machine be arranged adjacent the machine performing the last operation, so that the bottles can be transferred to it without any intermediate handling. In many instances it is necessary that the bottles be placed in the buckets of the cartoning machine bucket conveyor in a particular manner so that they will be correctly presented for insertion into the carton. This will be true particularly of rectangular bottles which must have their widest dimension aligned with the corresponding dimension of the cartons before they can be inserted. It is also frequently desirable for merchandising purposes that the labels on the bottles have some particular position with respect to the hinged portion of the flaps on the end of the carton.

The machines which fill and cap the bottles normally discharge them still in an upright position, and they must therefore be turned over onto their side in order to lie properly in the cartoning machine buckets. If the bottles are presented to the cartoning machine with their widest portions abutting they must be rotated about a vertical axis before being turned over onto their sides.

In accordance with my invention I have modified the structure of the buckets on the cartoning machine so that they can be tilted up to a near vertical position to receive the bottles, after which they return to their normal horizontal position for inserting the bottles into the cartons. The normal operation of the buckets and the continuous movement of the conveyor of which they form a part, is not interfered with in any manner. Also in accordance with my invention I have provided a conveyor which will convey upright bottles from the filling or capping machine or the like, and will present them in proper position to the buckets for transfer thereto, rotating them about a vertical axis where required, and transferring them to the buckets with such smoothness of movement that there is no danger of breakage.

It is therefore a primary object of my invention to provide a novel device for handling and transferring upright bottles from a filling or capping machine or the like onto the bucket conveyor of a cartoning machine, turning the bottles from their upright position to a horizontal position, all in one smooth continuous movement so that the cartoning machine can be kept continuously in operation and without affecting its carton erecting and loading operations.

It is another important object of my invention to provide a novel bucket conveyor which will normally carry bottles or the like in a horizontal position, but which is adapted to be displaced from its normal plane of operation in order to receive the bottles or the like being placed into it.

Another object is the provision of a novel conveyor having hinged buckets so that they can be tilted from their normal horizontal position during loading.

Other objects will become apparent as the description proceeds in connection with the accompanying drawings, wherein.

Figure 1:
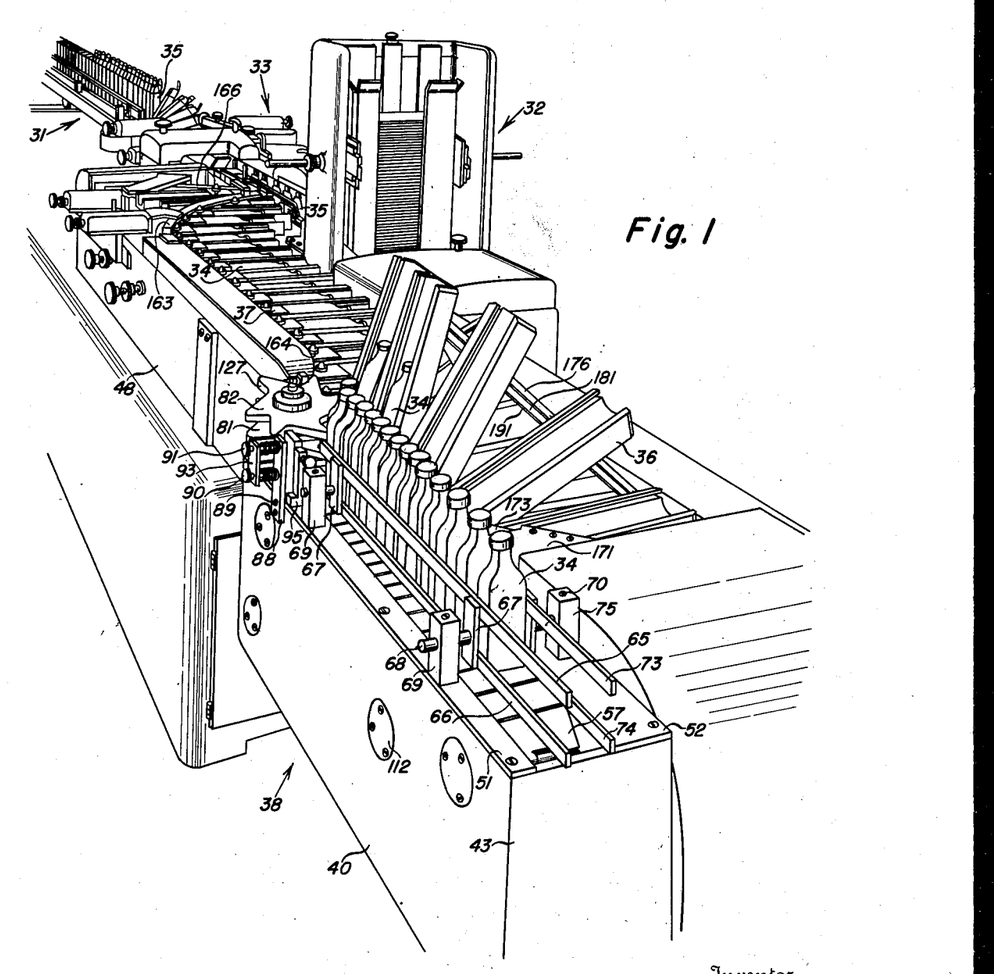
Figure 1 is a perspective view of a cartoning machine employing a bottle handling device in accordance with one embodiment of my invention.

Referring to the perspective view of Figure 1, the machine illustrated therein is a cartoning machine similar in construction and operation to that shown and described in the aforesaid application Serial Number 731,395 of Alexander H. Ross. As viewed in Figure 1, the movement of the interconnected conveyors is from right to left, so that the erected cartons with the bottles loaded therein are discharged at the left end of the machine onto the off-take conveyor indicated generally at 31. The flattened cartons are supplied by the magazine indicated generally at 32, and are erected or squared by a transport conveyor indicated generally at 33.

While on the transport conveyor 33 a bottle 34 is inserted into each carton 35 by the simultaneous action of the slidable receptacles in the form of troughs or buckets 36 and the reciprocable plungers 37 therein, all as described in said application Serial Number 731,395, and the carton may then be closed on both ends as described in said application, or only on one end, as shown in Figure 1. It is necessary that the bucket conveyor that includes the troughs or buckets 36 have the same longitudinal speed as the transport conveyor 33, and since the bottles are inserted into the erected carton while the transport conveyor 33 is moving, the buckets 36 must always maintain the proper transverse relationship with respect to the transport conveyor 33 in order that the longitudinal axes of the bottles 34 and cartons 35 will coincide so that the bottles can be inserted. When the bottles are cylindrical, a bottle loader such as shown in the aforesaid application Serial No. 731,395 may be used, but the bottles must be loaded into it on their sides.

When the bottles are rectangular however, as are the bottles 34 illustrated in Figure 1 they must lie on their proper side in the buckets 36 so that their widest dimension will coincide with the widest dimension of the carton to which it is presented for insertion. The buckets illustrated in this application have inclined bottoms so that the bottles will slide down and rest against the rear inner wall of the bucket irrespective of the width of the bottles but it will be understood that the buckets may have an adjustable side wall in the manner described in the aforesaid application Serial No. 731,395. The bottle handling and loading assembly indicated generally at 38 in Figure 1 is adapted to receive the rectangular bottles 34 from the bottle filling or capping machine and to transfer them to the buckets 36 while the latter are in their uppermost raised positions of Figures 1 and 5.

Referring particularly to Figures 1 to 5, the bottle handling and loading assembly 38 includes a casting having left and right side walls 40 and 41, a forward end wall 42 and a rear end wall 43. Adjacent the forward end wall 42 is a top wall or platform 44 (Figures 3 and 5) between the side walls. An integral boss or shelf 45 (Figures 3 and 5) is spaced below the platform 44 to provide a support for the ball bearing assembly 47. The entire casting is attached to the left wall 48 (Figure 5) of the casting which supports the bucket conveyor assembly, by means of cap screws 49 or the like, there being locating pins (not shown) to properly locate the wall 41 with respect to the wall 48.

Figure 5:
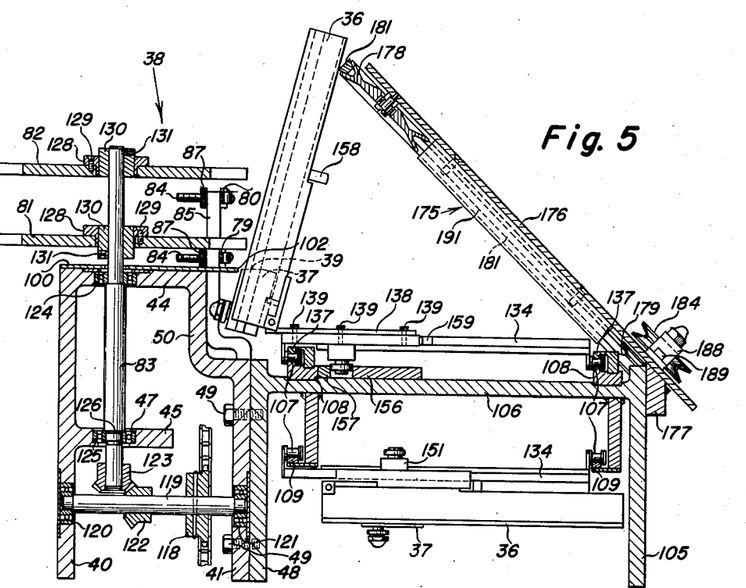
Figure 5 is a vertical sectional view substantially along the line 5—5 of Figure 2.

As best shown in Figures 2 to 5 the forward upper end of the right side wall 41 is recessed at 50 to provide clearance for the buckets 36 while being tilted to their upright position which is shown in Figure 5.

Figure 2:
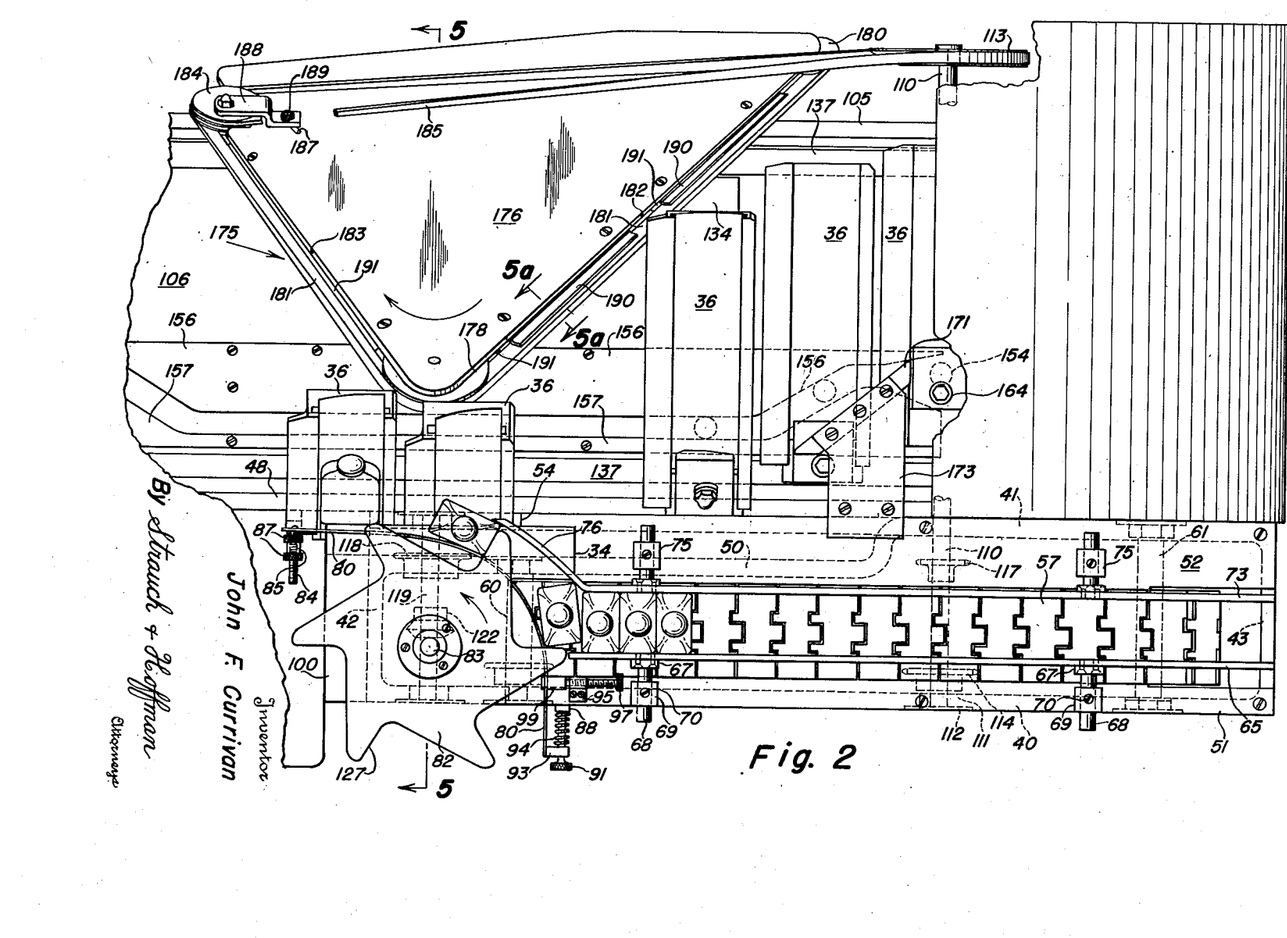
Figure 2 is a top plan view of the right hand end portion of the machine shown in Figure 1.

In the embodiment of the assembly 38 shown in Figures 1 to 5, the bottles 34 are received by the assembly with their widest faces abutting, as most clearly shown in Figures 1 and 2 and with their labels facing the direction of their movement. The open top of the assembly 38 casting is partially covered by two spaced and parallel longitudinally extending conveyor track supports 51 and 52 (best shown in Figures 1 and 4) which terminate in forward edges 53 and 54 respectively, the supports being attached to the top edges of the side walls 40 and 41 of the casting by screws 55. A hinged link conveyor belt 57 (Figure 3) passes over a driving sprocket 58 and a rear sprocket 59 mounted on driving and rear shafts 60 and 61 respectively, the driving sprocket being keyed to shaft 60. The links of the conveyor 57 are of such width that their outer edges rest upon the inner spaced portions of the track supports 51 and 52, these supports maintaining the upper run of the conveyor horizontal and in the same plane that they leave and engage the sprockets 59 and 58. At their rear ends the track supports 51 and 52 are recessed at 63 and 64 to permit the conveyor 57 to clear them as it rounds the sprocket 59. The sprockets 58 and 59 turn counter-clockwise as viewed in Figure 3, so that the bottles 34 are moved from right to left.

Figure 3:
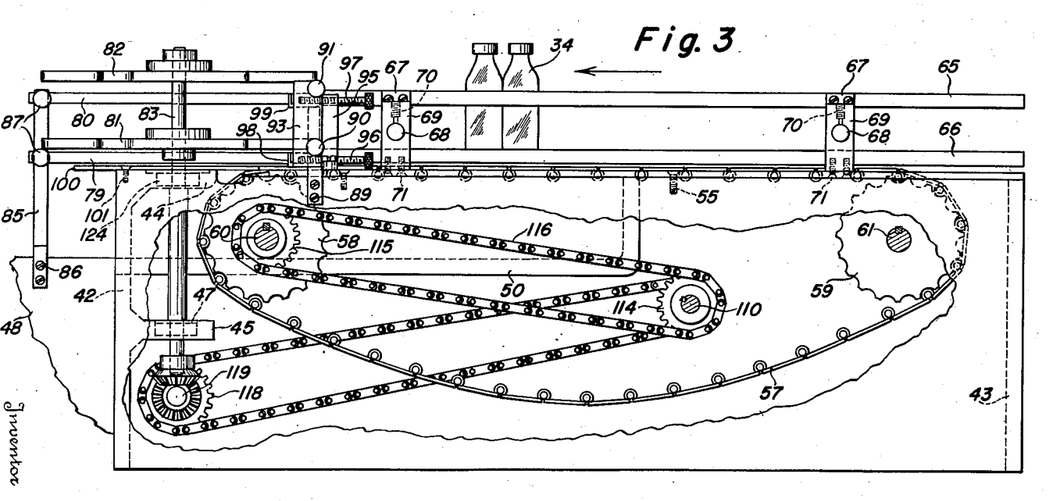
Figure 3 is a side elevation, partly in section, of a portion of the machine shown in Figure 2.
Figure 4:
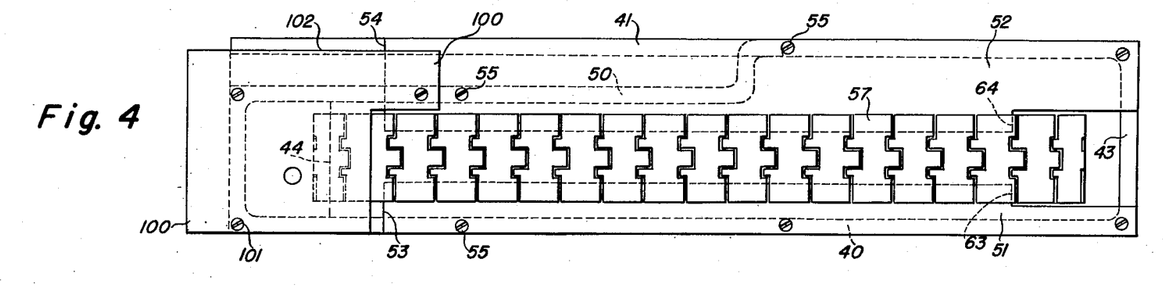
Figure 4 is a top plan view of a portion of the device shown in Figure 2 but with some of the parts omitted.

The bottles 34 may be fed onto the conveyor belt 57 at the right or infeed end of the assembly 38 in any suitable manner from the last previous machine such as the bottle filler or capper. The bottles 34 are guided so as to remain on the conveyor belt 57 by two oppositely disposed and adjustably spaced fence assemblies. Referring to Figures 1 and 2 one assembly comprises vertically spaced guide members 65 and 66 connected by a pair of spacer members 67. Each spacer member 67 has a rod 68 secured thereto and each rod 68 has a sliding engagement through a post 69 so that the guide members 65 and 66 may be adjusted transversely of the conveyor belt. The adjustment is secured by set screws 70 in the posts 69, engaging the rods 68. The posts 69 are secured to the upper surface of the conveyor track 51 as by screws 71 (Figure 3). The other fence assembly comprises a pair of guide members 73 and 74 similarly supported for transverse adjustment by a pair of posts 75 mounted upon the upper surface of the other track support 52. As best shown in Figure 2 however, each of the guide members 73 and 74 are longer than the opposite members 65 and 66, and at their forward ends they have arcuately curved sections as shown at 76, it being understood that the lower guide member 74 which is out of sight in Figure 2 is identical to the upper guide member 73 and has a similar curved section 76.

Cooperating with the curved sections 76 on the upper and lower guide members 73 and 74 to rotate the bottles through 90 degrees and transfer them to the elevated buckets 36 is another pair of adjustable and vertically spaced guide strips 79 and 80 (Figures 2 and 3) and a pair of aligned vertically spaced star wheels 81 and 82 which are affixed to a vertical shaft 83 that rotates in a counter-clockwise direction as viewed in Figure 2. The forward ends of the guide strips 79 and 80 have threaded pins 84 affixed to them, the pins having a slip fit through vertically spaced holes in a bracket 85 attached by screws 86 (Figure 3) to the left wall 48 of the bucket conveyor casting. The forward ends of the guide strips 79 and 80 are adjustable towards or away from the buckets 36 by means of a pair of nuts 87 on each threaded pin 84, there being a nut on each side of the bracket 85.

The guide strips 79 and 80 are flexible so that their curved contours can be changed with relation to the curved sections 76 and the star wheels 81 and 82 so that they can be adjusted to handle various sizes of bottles. Although flexible, when both ends are secured in their adjusted positions, the guide strips are sufficiently rigid that they are not flexed by the bottles in their movement. At their rear ends, adjacent the forward ends of the guide members 65 and 66, each guide strip 79 and 80 is adjustably secured as follows. A vertical bracket 88 is secured to the left side wall 40 as by screws 89. A pair of vertically spaced headed screws 90 and 91 are threaded through the bracket 88. A vertical block 93 may slide on the screws 90 and 91 and is pressed outwardly and away from the bracket 88 and against the heads of the screws by a pair of springs 94, one on each screw 90 and 91. The block 93 is thus adjusted towards or away from the bracket 88 by the simultaneous turning of screws 90 and 91. The ends of the guide strips 79 and 80 are fixedly secured to the forward flat edge of block 93 so that the guide strips are moved with the block. This will move the rear ends of the guide strips closer or further away from the curved sections 76 on the guide members 73 and 74.

Inwardly towards the conveyor belt 57 from the bracket 88 is another vertical bracket 95 through which are threaded a pair of vertically spaced bolts 96 and 97. These bolts are in the same horizontal planes as the guide strips 79 and 80 respectively, and on their ends that protrude through the bracket 95 the bolts carry blocks 98 and 99 respectively, each block being fixed axially with respect to its bolt, but permitting the bolt to rotate, so that rotation of the bolts will move the blocks to the right or left as viewed in Figure 2. Each block 98 and 99 has a transverse vertical slot which receives the guide strips 79 and 80 respectively with a fit which permits them to slide transversely through the blocks 98 and 99 as the strips are adjusted by the headed screws 90 and 91. The screws 90 and 91 and the bolts 96 and 97 thus provide for the adjustment of the rear end portions of the guide strips 79 and 80, and with the previously described adjustment of the forward ends of the guide strips where they are mounted on the bracket 85, the guide strips can be adjusted to any desired contour with respect to the curved sections 76 on the guide members 73 and 74, and with the star wheels 81 and 82 so that bottles of various sizes may be handled.

Beyond the point where the conveyor belt 57 passes under the track supports 51 and 52 at their forward edges 53 and 54, the bottles pass onto the top surface of a fixed or dead plate 100 (Figure 4) which is fastened to the top of the casting walls 40 and 41 as by screws 101 and has the same thickness as the links of the hinged link conveyor belt 57 so as to present no obstruction to the bottles as they are transferred thereto from the conveyor belt by the action of the rotating star wheels 81 and 82. It is the function of the star wheels 81 and 82 to transfer the bottles from the conveyor belt 54 onto the dead plate 100 and move it over that plate as guided by the curved sections 76 and by the guide strips 79 and 80.

Figure 6:
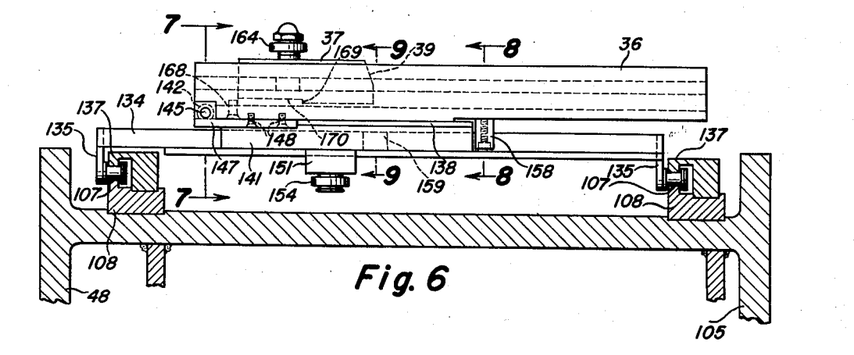
Figure 6 is an enlarged view in side elevation of the tilting bucket shown in Figure 5.

As best shown in Figures 2 and 5 the guide strips 79 and 80 direct the bottles towards the right edge 102 of the dead plate 100 so that they slide off this edge and into an uplifted bucket 36, which is so timed in its movement as to be in transverse alignment with the bottle as it slides from the dead plate. As shown in Figure 6, the right face of the plunger 37 is inclined to the left and upwardly, so that when the bucket is uprighted as in Figure 5 a horizontal surface 39 is provided in substantially the same horizontal plane as the top of the dead plate 100. The bottle will slide over the surface 39 before it topples through a small angle and rests against the bottom of the bucket. It will be understood that the forward ends of the guide strips 79 and 80 can be adjusted transversely towards or away from the buckets 36 to assure the transfer of the bottles to the buckets when the buckets are at their highest elevation. It will also be understood that the forward end of the upper guide strip 80 may be adjusted to a position closer to the buckets than the lower guide strip 79 so as to assist the action of gravity in toppling the bottles into the buckets.

Referring to Figure 5 the bucket conveyor support casting comprises the left wall 48, right wall 105 and an upper horizontal connecting wall 106. A pair of endless chains 107 have their upper runs above the wall 106, and their lower run below the wall, being supported and guided by upper tracks 108 and lower tracks 109, all affixed to the wall 106 in the manner described in the aforesaid application Serial No. 731,395. As also described in that application, the chains are driven by a drive shaft and sprockets at the forward end of the bucket conveyor, and at their rear ends the chains pass over sprockets on a tailshaft journalled in the side walls of the casting. The tailshaft 110 of the bucket conveyor is shown in plan in Figure 2 herein, and is shown to extend through the right side wall 41 of assembly 38 and to be journalled in a ball bearing assembly 111 in the left side wall 40, the bearing assembly being retained therein by a plate 112. This extension of the tailshaft 110 serves as a power supply for the assembly 38, as will be described. The other end of the tailshaft is journalled in but protrudes through the casting right wall 105 and has affixed thereto a V belt drive pulley 113 for a purpose to be described.

Referring to Figures 2 and 3 the tailshaft 110 has keyed thereto a sprocket 114 that lies in the same vertical plane as a sprocket 115 keyed to the driving shaft 60 for the conveyor belt 57. A chain 116 passes over these sprockets whereby the conveyor belt 57 is driven by the tailshaft 110. As shown in Figure 3 the lower run of the conveyor belt 57 sags below the plane of the tailshaft 110 and sprocket 114 so as to clear them, the upper run being supported in horizontal position by the track supports 51 and 52.

Another sprocket 117 (Figure 2) keyed to the tailshaft 110 is in the same vertical plane as a sprocket 118 (Figures 2, 3 and 5) keyed to a horizontal shaft 119 journalled in bearings 120 and 121 in the side walls 40 and 41 of the assembly 38. A bevel gear 122 fixed to the shaft 119 drives a mating bevel gear 123 affixed to the bottom of the vertical shaft 83 that carries the star wheels 81 and 82. The shaft 83 is journalled in an upper bearing 124 in the platform 44 and in the bearing 47 in the shelf 45. As shown in Figure 5 the outer race of the bearing 47 rests upon a shoulder 125 in the shelf 45 and the lower portion of shaft 83 is reduced in diameter to provide a shoulder 126 that rests upon the inner race of the bearing.

The tailshaft 110 thus provides the driving means for both the conveyor belt 57 and the rotating star wheels 81 and 82. These wheels 81 and 82 each have peripheral pockets that provide radial faces 127 (Figure 2) which protrude into the arcuate fenced path for the bottles between the guide strips 79 and 80 and the curved sections 76, the faces 127 on the two star wheels being in vertical alignment. The speed of rotation of the star wheels and the number of radial faces thereon are so related with the rate of movement of the conveyor carrying the buckets 36 that the star wheels with the aid of the guide strips 79 and 80, will bring a bottle into alignment with and discharge it into each bucket while the bucket is elevated and moving at a steady rate. It will be apparent from Figure 2 that the conveyor belt 57 moves the bottles to the left until they engage the guide strips 79 and 80, after which the faces 127 of the star wheels engage the bottles and move them transversely of the direction of their previous movement. The star wheels may be secured to hubs 128 (Figure 5) as by screws 129, the hubs being fixedly secured to sleeves 130 which may be adjustably secured to the shaft 83 as by set screws 131.

The buckets 36 are of generally similar construction and attached to the endless chains in the same manner as those described in the aforesaid application Serial No. 731,395 except that they are modified so that they can be tilted upwardly as shown in Figures 1, 2 and 5 to receive the bottles discharged from the dead plate 100. Referring particularly to Figures 5 to 9 each bucket 36 is slidably mounted on a dovetail slide 134 which has affixed to each end thereof a depending ear 135. Each ear has affixed thereto a pair of chain link pins 136 (Figure 8) so spaced as to connect the adjoining links of the corresponding endless chain 107. On their upper runs the chains 107 are confined between the tracks 108 and hold down members 137, so that the dovetail sides 134 are maintained in horizontal position. A plate 138, of considerably shorter length than the dovetail slide 134, has affixed to its under surface, as by screws 139 (Figures 9 and 5), a pair of gibs 140 and 141 which fit into the grooves on the opposite sides of the dovetail slide 134, whereby the plate 138 is attached to the slide but can slide along it and transversely with respect to chains 107.

Figures 7, 8, 9:
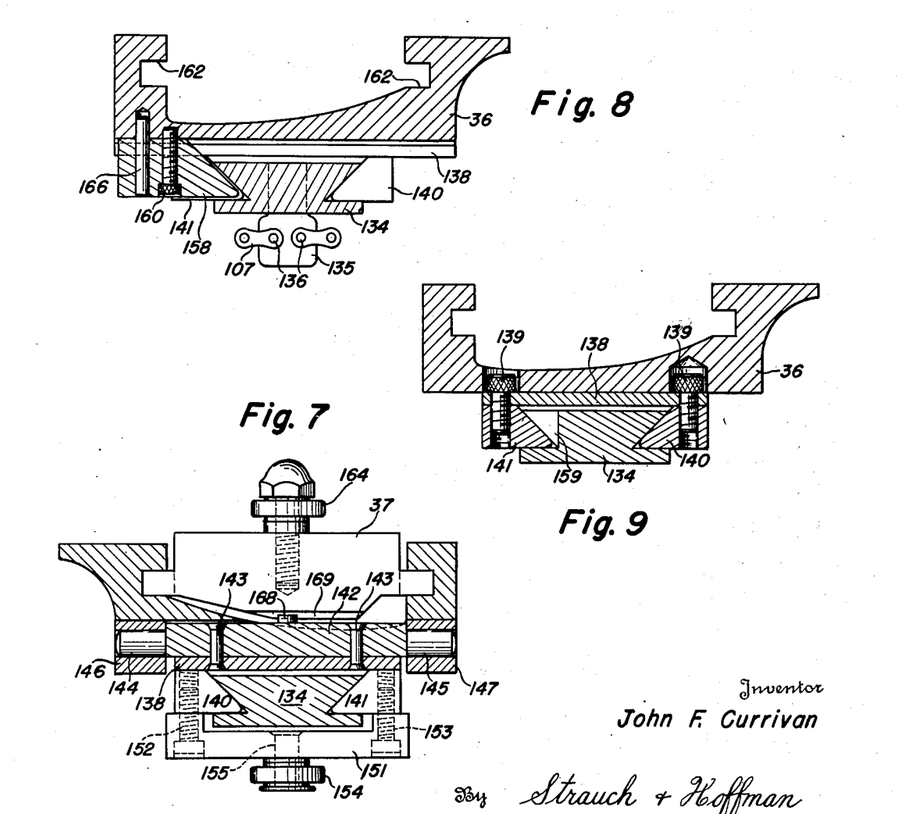
Figure 7 is a sectional view substantially along the line 7—7 of Figure 6.
Figure 8 is a sectional view substantially along the line 8—8 of Figure 6.
Figure 9 is a sectional view substantially along the line 9—9 of Figure 6.

At the left end of the plate 138 as viewed in Figure 6, a round rod 142 having a flattened bottom is fastened to the top of the plate by rivets 143 (Figure 7). The ends of the rod are rounded to a reduced diameter to provide pivot pins 144 and 145. The lower left hand corner of the bucket 36, as viewed in Figure 6, has a rectangular transverse section removed, the rod 142 lying within the space so provided. Hinge brackets 146 and 147 are secured to the underside of the bucket, one on each side thereof, by screws 148 (Figure 6). Each bracket 146 and 147 has an upwardly extending portion which is bored to fit over the respective pivot pin 144 or 145, thus hingedly connecting the bucket 36 to the plate 138 so that it can be tilted to the position shown in Figure 5 while the bottle is transferred to it.

By the construction so far described, each bucket may be shifted transversely with respect to the endless chains 107 because of the engagement of the gibs 140 and 141 with the dovetail slide 134. A yoke 151, which bridges the dovetail 134, is attached at its ends to the gibs 140 and 141 on each bucket, by screws 152 and 153 (Figure 7), and each yoke has a ball bearing assembly 154 affixed to its underside by a stud 155 passing through and securing the bearing inner race to the yoke, allowing the outer race to rotate freely. The outer bearing race thus provides a follower which engages the cam tracks 156 and 157 (Figures 2 and 5) secured to the top surface of the connecting wall 106 to shift the bucket transversely of the chains 107 in accordance with the operation being performed at any particular time. As best shown in Figure 2, the cam tracks 156 and 157 are so shaped as to shift the buckets transversely from their normal path and toward the conveyor belt 57 and the star wheels on the assembly 38, after which they are shifted back to normal position. The same cam tracks may also be so shaped as to shift the buckets to insert pamphlets therein and they also assist in loading the cartons as described in the aforesaid application Serial No. 731,395.

Means are provided to latch the buckets 36 to the dovetail slides 134 so that they cannot be tilted with respect to the slides except during the time that it is desired to raise them as in Figure 5. Otherwise the buckets would swing downwardly about their pivots 144 and 145 during their return run under the wall 106. This latch takes the form of a short gib 158 (Figures 6 and 8) located by pin 166 and secured by a screw 160 to the bottom of the bucket 36 instead of to the plate 138, and engaged with the angular guideway on one side of the dovetail slide 134 so that the bucket cannot be pivoted. However when the bucket has been shifted to the left as view in Figure 5 the short gib 158 lies abreast of a cut-away portion or notch 159 (Figures 5, 6 and 9) in the dovetail slide, so that the short gib is disengaged from the slide and the bucket can be raised. After it has been raised, loaded, and lowered again the bucket is shifted to the right again as viewed in Figure 5 by the cam track 157 whereupon the short gib 158 latches the bucket in horizontal position again.

Each bucket 36 is provided with a plunger 37 mounted to slide longitudinally in the guideways 162 bucket as described in said application Serial No. 731,395, and operable to be shifted therein by means of cam tracks 163 (Figure 1) mounted above the buckets and which engage the rollers 164 secured to the tops of the plungers by studs 165 (Figure 7). The cam tracks 163 serve to shift the plungers so as to eject the bottles 34 from the buckets 36 and insert them into the cartons on the transport conveyor, after which a succeeding cam track 166 (Figure 1) moves the plungers back to a position towards the hinged end of the bucket, substantially in the position that the plunger is shown in the lower run of the bucket conveyor in Figure 5. When the bucket rises to the position shown in the upper run of Figure 5 the plunger 37 will ordinarily slide downwardly due to its own weight to the position shown so that the bottle will clear it as it is shoved off of the dead plate 100. This downward position of the plunger is determined by a stop pin 168 (Figures 6 and 7) which is engaged by a transverse abutment 169 on the underside of the plunger formed by the terminus of a recess 170 (Figure 6) that clears the stop pin 168. In order to assure that the plunger has been shifted to the position shown in Figure 5 when the bucket is lifted, an upper cam track 171 (Figures 1 and 2) mounted on a bracket 173 engages the roller 164 on the plunger just after the bucket has rounded the sprockets (not shown) on the tailshaft 110, and moves the plunger to the end of its stroke against the stop pin 168 before the bucket begins to be tilted upwardly by means now to be described. As viewed in Figures 1 and 2, a protecting cover plate 174 covers the end of the bucket conveyor when it rounds the sprockets on the tailshaft 110.

Referring to Figures 5, 2 and 1, a bucket lifting assembly, indicated generally by the reference number 175, comprises a flat triangular plate 176 that is supported in the inclined position shown in Figure 5 by being affixed to the top inclined surface of a supporting plate 177 suitably secured to the outer side of the wall 165 of the bucket conveyor supporting casting. The corners of the triangular plate 176 are provided with V belt pulleys 178, 179 and 180 that are supported by their axle pins below the plane of the triangular plate 176, and guide a moving V belt 181 around the periphery of the plate 176, the belt lying substantially outside of the upwardly inclined edges 182 and 183 of the plate. The belt 181 is thereby so located that after the buckets 36 have rounded the tailshaft 110 and have been unlatched for hinged movement by alignment of the short ribs 158 with the notches 159, the leading edges of the free ends of the buckets will engage and ride upon the V belt 181 so that the buckets will be successively tilted upwardly during their forward movement, because of the forward movement of the endless chains 107 and the clockwise movement of the V belt as viewed in Figure 2. As the bucket reaches the point where the V belt reaches its apex in passing over the upper pulley 178 it has reached its maximum lift, which position it holds for a moment as its flat underside rounds the arc of the belt at its apex. A bottle is loaded into each bucket at this point, and after the bucket passes the apex of the belt arc it again descends until it as again resting upon the plate 138, whereupon a curve in the cam track 157 shifts the bucket to latch it to the dovetail slide 134 again by means of the short rib 158.

Figure 5A:
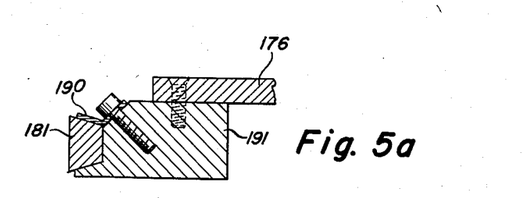
Figure 5a (Sheet 6) is an enlarged sectional view substantially along the line 5a—5a of Figure 5.

The forward pulley 179 is keyed to a shaft that also has keyed thereto a drive pulley 184. A V belt 185 is trained over the drive pulley 184 and also over the V belt pulley 113 affixed to the tailshaft 110, the diameters of these pulleys being such that the V belt 181 moves in its path at substantially the same speed as the buckets which ride upon it during their raising and lowering movements. The two pulleys 179 and 184 have their shaft mounted in a bracket 188 which is secured to the triangular plate 176 by a bolt 189 passing through the bracket and a slot 187 in the plate (there being a nut beneath the plate 176 as will be understood) so that the bracket 188 and the shaft can be shifted to adjust the tension of the two V belts. In order to prevent sagging of the belt 181 under the weight of the buckets, supporting and guiding members 191 (see Figure 5a on Sheet 6) are secured to the underside of triangular plate 176 along its edges 182 and 183 between the pulley 178 and pulleys 179 and 180. There are two members 191 on the rear edge 182 of plate 176 and each has secured thereto a longitudinally extending guide plate 190 that provides an upper guide for the belt 181. Otherwise the force required to raise the buckets might twist the belt off of its guide members 190. The single longer guide member 191 on the forward edge of the plate 176 does not require the upper guides 191 because the buckets do not exert as great a twisting force on the belt 181 while they are being lowered.

Figure 10:
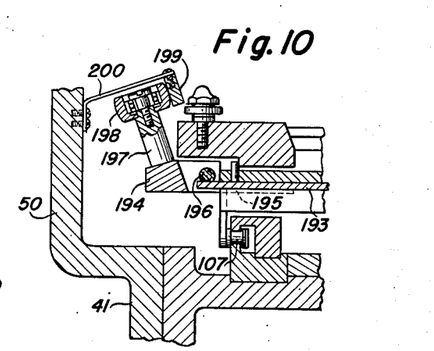
Figures 10, 11 and 12 are enlarged fragmentary views of the hinged end of a bucket which is substantially similar to that of Figures 5 to 9, except that it is tilted by means of a cam track engaging a roller on the bucket.
Figure 11:
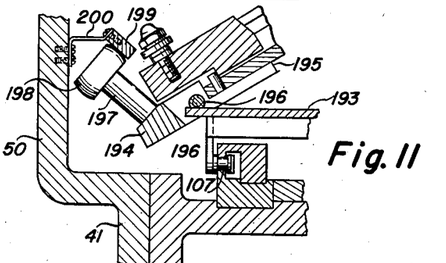
Figure 12:
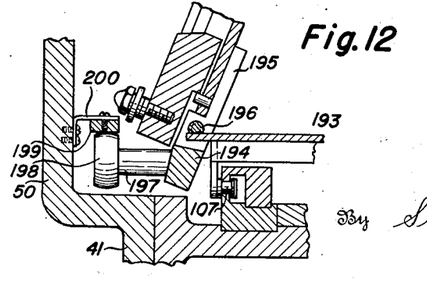

An alternate construction for the raising and lowering of the hinged buckets is illustrated in Figures 10, 11 and 12 which show successive positions of the bucket. As shown in Figure 10, the brackets 195, which correspond to the brackets 146 and 147 of Figures 6 to 9, etc., extend beyond the bucket pivot 196 and are integrally joined by a bridge member 194 that carries a stud 197 which supports a ball bearing journalled cam follower roller 198. The plate 193 corresponds to the plate 138 of Figures 6 to 9, etc., and carries the pivot 196 upon which the bracket 195 and integral bridge are pivoted. A curved cam track 199 is supported on the recessed wall 50 of the bottle loading assembly casting by means of brackets 200. The cam track 199 is of such shape that as the chains 107 move the buckets the cam track will gradually raise the bucket from the level position of Figure 10 to the fully raised position of Figure 12, where the bucket is loaded, after which the curve of the cam track is reversed to lower the bucket again. Figure 11 represents an intermediate position between the horizontal position of Figure 10 and the fully raised position of Figure 12, either while the bucket is being raised or lowered, as will be understood. All of the previously described means for unlatching the hinged bucket and for moving the plunger to the end of its stroke are used as described in connection with the previous embodiment.

Figure 13:
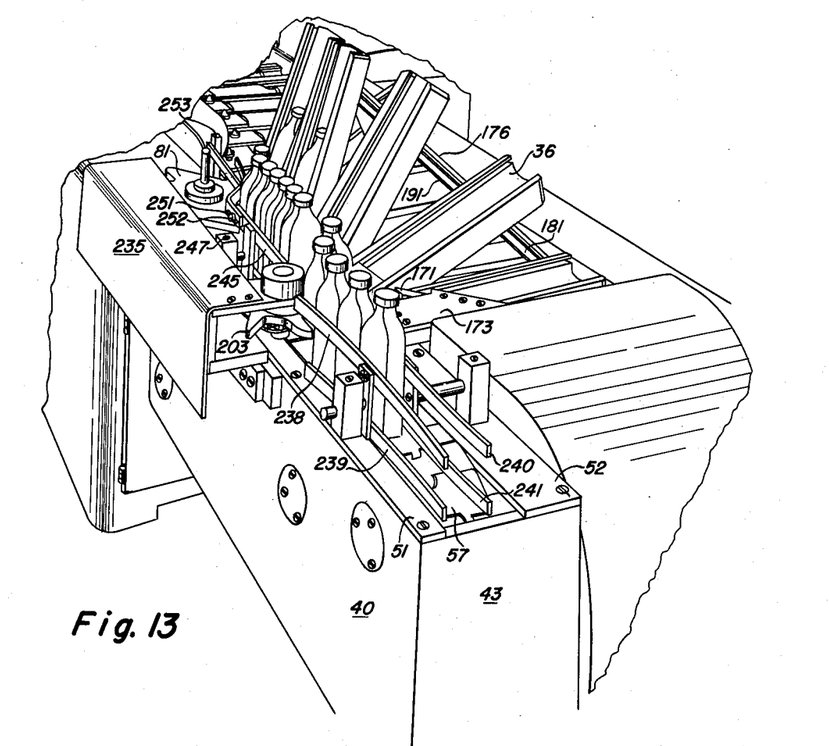
Figure 13 is a view of a portion of a machine similar to that shown in Figure 1, but illustrating another embodiment of the invention.

Figures 13 to 16 illustrate another embodiment for handling bottles in the manner previously described, but where the bottles are fed to the conveyor belt 57 in the relative positions shown in Figure 13, that is, with the short side walls of the bottles in abutting relationship, and with the labels facing towards the bucket conveyor. In order to use the previously described apparatus with a minimum of modification, means are provided to rotate the bottles through 90 degrees while they are still on the conveyor belt 57, so that after such rotation they may be handled and loaded into the buckets in the same manner as previously described.

Figure 15:
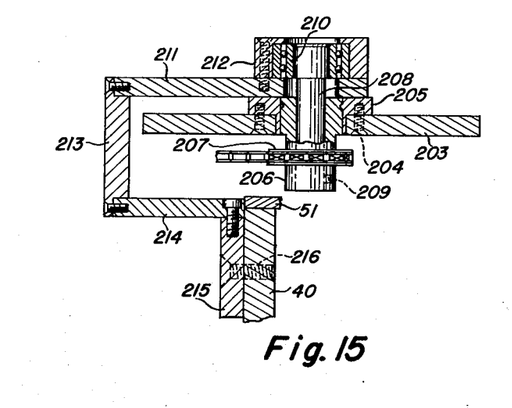
Figure 15 is an enlarged sectional view substantially along the line 15—15 of Figure 14.

The means for rotating the bottles comprises a power driven star wheel 203 mounted for rotation about a vertical axis to one side of and approximately midway of the length of the conveyor belt 57. As best shown in Figure 15, the star wheel 203 is affixed as by screws 204 to a collar 205 keyed to a hub 206 having a sprocket 207 keyed thereto and fastened to a rotary vertical shaft 208 as by a set screw 209. The shaft 208 is suitably fixed in the inner race 210 of a ball bearing assembly the outer race of which is located and fastened to the top member 211 of a bracket assembly by a retainer 212. The other members 213, 214 and 215 of the assembly maintain the member 211 in horizontal position, the member 215 being secured to the wall 40 of the casting as by screws 216.

A chain 217 passing over the sprocket 207 drives the star wheel 203 from an intermediate sprocket assembly indicated generally at 218 and having its axis substantially offset from the path of the conveyor belt 57 so that the drive for the star wheel 203 does not interfere with the free movement of the bottles.

Figure 14:
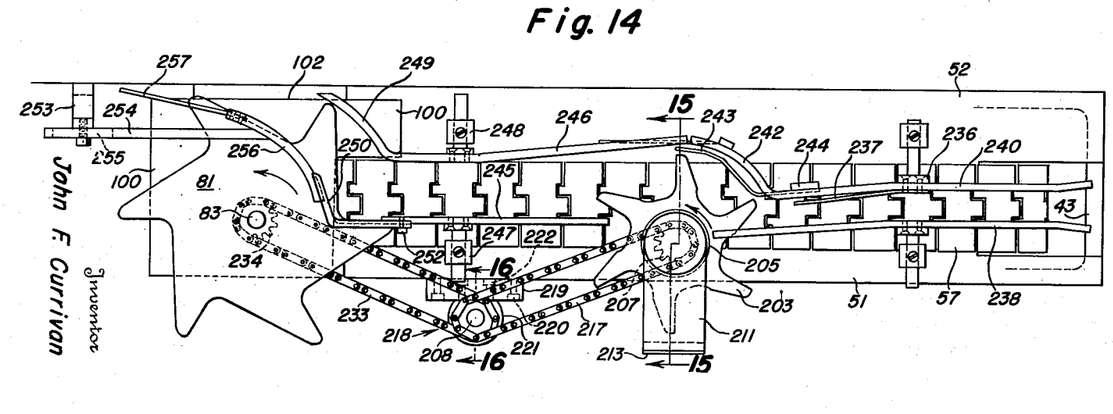
Figure 14 is a top plan view of a portion of the machine shown in Figure 13.
Figure 16:
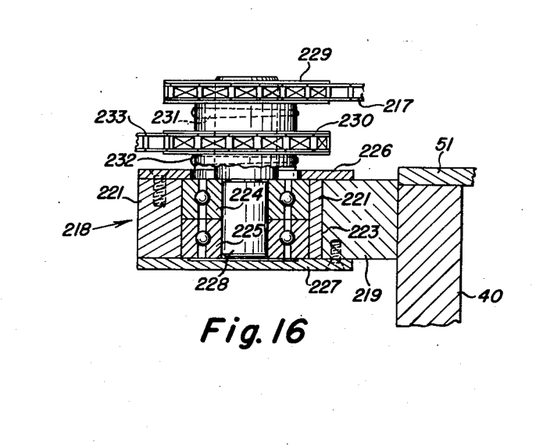
Figure 16 is an enlarged sectional view substantially along the line 16—16 of Figure 14.

Referring to Figures 14 and 16, a bracket 219 is secured to the wall 40 by screws 220. A hollow cylindrical member 221 is attached to the bracket by screws 222, the exterior wall of the cylindrical member 221 having a flattened portion at 223 which lies against the flat surface of the bracket 219. A pair of ball bearing assemblies 224 and 225 are held within the bore of the cylindrical member 221 by upper and lower retainers 226 and 227, and journal a shaft 228 for rotation on a vertical axis. A pair of sprockets 229 and 230 are keyed to the shaft 228 as by tapered pins 231 and 232 so that they rotate together. The chain 217 from the sprocket 207 on the shaft 208 of the star wheel 203 passes around the upper sprocket 229 and another chain 233 passes around the lower sprocket 230 and around a sprocket 234 (Figure 14) keyed to the shaft 83 which carries the two vertically spaced star wheels 81 and 82. As will be understood, the diameter of the star wheel 203 with respect to the star wheels 81 and 82, and the diameters of the sprockets 207, 229, 230 and 234 are such that the bottles will be moved at such a rate as not to be jammed between the horizontally spaced star wheels 81–82 and 203. In Figures 13 and 14 the upper star wheel 81 has been removed to more clearly show the elements between it and the lower star wheel. As shown in Figure 13, a guard cover 235 protects the operator of the machine from entanglement with the chains 217 and 233 or their sprockets.

Referring to Figures 13 and 14 when the bottles are first fed onto the conveyor belt 57, with the narrow sides of the bottles abutting, they are guided by spaced pairs 238, 239, and 240, 241 of guide bars which are adjustable towards each other in the manner described in connection with Figures 1 and 2. At their forward ends the guide bars 240 and 241 have attached thereto or integral therewith, curved sections 242 extending substantially around the periphery of the star wheel 203 to form an outer guide for the bottles being rotated by the star wheel 203. A resilient guide strip 243 (Figure 14) fixed only at its rear end to the midpoint of a bracket 244 which connects the guide bars 240 and 241 resiliently retains the bottles in the pockets of the star wheel 203. A straight resilient member 237 is fastened only at its rear end to a bracket 236 connecting the guide members 240 and 241, and projects into the path of the moving bottles to keep them against the other pair of guide members 238 and 239. The resilient member 237 lies substantially in the same horizontal plane as the curved resilient guide member 243, that is, between the upper and lower guide members 240 and 241.

After the bottles have been rotated by the star wheel 203 they pass between the more widely spaced pairs of guide bars 245 and 246 mounted for transverse adjustment in the blocks 247 and 248. Only the upper bar of each vertically spaced pair of bars 245 and 246 is shown in the plan view of Figure 14 as will be understood. At their forward ends the bars 246 terminate in curved sections 249 which correspond to the curved sections 76 of Figure 2, to retain the bottles in the pockets of the star wheels 81–82 until they fall off the dead plate 100 into the buckets as previously explained. At their forward ends, each of the pair of guide bars 245 have attached thereto a short curved section 250 which has a longitudinal slot 251 (Figure 13) through which passes a bolt 252 that fastens the curved section to its respective guide bar 245. A bracket 253 corresponding to the bracket 85 of Figures 2 and 3 provides a support at the forward ends of a pair of similar but vertically spaced rectangular support rods 254 each of which is fastened to the bracket 253 by a bolt passing through a longitudinal slot 255 (Figure 14) in the support rods so that the rods can be longitudinally adjusted. At its rear end, each rod 254 has fixedly attached thereto a curved section 256 which is substantially concentric with the curved sections 249. The rear end of each curved section 256 overlaps its corresponding curved section 250. At its rear end each curved section 256 has attached thereto a forwardly extending resilient extension guide strip 257. As will be apparent from Figure 14, the curved sections 256 and their resilient extensions 257 serve in cooperation with the rotating star wheels 81–82 to slide the bottles over the edge 102 of the dead plate 100 and into the buckets 36.

I have thus provided a novel bottle handling and loading assembly which handles upright bottles and transfers them without shock to a conveyor which carries them in horizontal position, the latter conveyor being constructed so that its bucket elements are tilted to a near vertical position in order to receive the bottles, and are then guided to their normal horizontal position. The loading assembly operates continuously and does not employ any intermittently moving parts. It is fully adjustable within its designed limits to handle bottles of various sizes which are to be loaded into corresponding sizes of cartons. While it has been described in connection with bottles of rectangular cross-section, which must be presented for insertion into the cartons only when aligned therewith, it is to be understood that cylindrical bottles are as easily handled. The bottle turning star wheel 203 of Figures 13–15 would not be required in the event that cylindrical bottles are being loaded, in which event that star wheel with its driving mechanism can be removed and the system of guides shown in the embodiment of Figures 1 to 3 employed for guiding the bottles towards and around the star wheels 81–82. It is also to be understood that the movement of the belt conveyor 57 need not be parallel to that of the bucket conveyor, but may be at any angle with respect thereto, since the star wheels 81–82 can rotate the bottles through angles other than 90 degrees before moving them off of the dead plate 100, and the assembly 38 may be driven from the tailshaft 110 by means of a universal joint connection or a flexible shaft as will be understood.

The invention may be embodied in other specific forms without departing from the spirit or essential characteristics thereof. The present embodiments is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a handling and conveying system, a first conveyor having article receptacles moving in a horizontal rectilinear path; means to rotate said receptacles from an initial horizontal position towards a vertical position and then back to their initial position while moving in said rectilinear path; a second conveyor moving in a horizontal rectilinear path substantially coplanar with the path of said first conveyor; and means operable to transfer articles from said second conveyor to said receptacles at the time that the receptacles on said first conveyor are rotated towards their vertical position.

2. In a conveyor system, an endless conveyor having a working upper arm and an idle lower return run, said conveyor including a series of normally horizontal trough shaped receptacles hinged thereto; means for tilting said receptacles towards a vertical position during the upper run of the conveyor; and means for inserting articles into said receptacles while tilted upwardly; said receptacles having means for retaining articles therein while tilted toward a vertical position.

3. The apparatus described in claim 2 wherein said receptacles are hinged at one end to said conveyor about axes parallel to the movement of said conveyor.

4. In the apparatus described in claim 3, means for latching said receptacles against tilting movement during the idle lower return of the conveyor.

5. In a handling and conveying system, a conveyor moving in a horizontal rectilinear path; trough shaped receptacles on said conveyor arranged transversely to its direction of movement, said receptacles being pivotally attached to said conveyor about aligned axes parallel to its direction of movement; means operable to rotate said receptacles from their normal horizontal position to an upright position and back to their normal position while moving in said rectilinear path; and means operable to load articles into said receptacles while they are in their upright position.

6. In the apparatus described in claim 5; means in said receptacles operable to eject articles from said receptacles while they are in their horizontal position.

7. In the apparatus described in claim 6, said ejecting means comprising plungers slidable in said receptacles; and means operable to move said plungers to one end of said receptacles before said receptacles are loaded in their upright position.

8. In the apparatus described in claim 7, said plungers being in the lower end of said receptacles when the receptacles are uprighted, and providing a support for the articles being loaded into the receptacles.

9. In an article handling and conveying system, a conveyor moving in a horizontal rectilinear path; trough shaped receptacles on said conveyor arranged transversely to its direction of movement, said receptacles being pivotally attached to said conveyor about aligned axes parallel to its direction of movement; means operable to rotate said receptacles from their normal horizontal position to an upright position and back to their normal position; a horizontal support adjacent the path of the lower ends of said receptacles when they are in upright position; and means operable to transfer articles in upright position from said support to the uprighted receptacles.

10. In the apparatus described in claim 9 said last mentioned means including a wheel having peripheral pockets and rotating in a substantially horizontal plane above said support; and guide means operable to direct articles into said pockets and then from said pockets toward said receptacles.

11. In the apparatus described in claim 9, said last mentioned means including a wheel having peripheral notches and rotating in a substantially horizontal plane above said support; guide means operable to direct articles into said pockets and then from said pockets toward said receptacles; and a conveyor operable to deliver articles to said guide means and wheel.

12. In an article handling and conveying system, a conveyor movable in a horizontal rectilinear path; trough shaped receptacles on said conveyor arranged transversely to its direction of movement, said receptacles being pivotally connected to said conveyor about axes parallel to its direction of movement, and also slidably mounted on said conveyor for shifting movement transverse of the direction of conveyor movement; means operable to rotate said receptacles from their normal horizontal position to an upright position and back to their normal position; a support adjacent the path of the lower ends of said receptacles when they are in upright position; means operable to transfer articles in upright position from said support to the uprighted receptacles; and means operable to slide said receptacles from their normal positions laterally towards said support and then back to their normal lateral positions, whereby said receptacles are closer to said support when uprighted.

13. The apparatus defined in claim 12 wherein said last named means is effective to shift said receptacles laterally before they begin to upright, and then to shift them back to normal lateral position after they have returned to their normal horizontal position.

14. The apparatus defined in claim 13 wherein latch means are provided to prevent the pivotal movement of said receptacles except during the interval that they are in their lateral shifted position towards said support.

15. In a conveyor, a pair of spaced parallel endless elements having a run in a horizontal plane; a transverse member affixed at its end portions to said elements, a receptacle arranged transverse to said elements, slidable upon said member transversely of said elements and pivoted at one end to said member about an axis parallel to the direction of movement of said elements; means operable to shift the receptacle transversely to one end of its stroke; means to upright the receptacles while so shifted, and means operable to load an article into said receptacle while so uprighted.

16. In a conveyor, a pair of spaced parallel endless elements having a run in a common horizontal plane; a transverse member affixed at its end portions to said elements, a receptacle arranged transverse to said elements and hinged at one end to said member for rotation about an axis parallel to the direction of movement of said elements; and a receptacle tilting device comprising a third endless element lying in a plane intersecting that of the movement of said receptacle, said third endless element being movable to lift the unhinged end of said receptacle to an upright position and then lower it again.

17. In an article handling and conveying system, a conveyor moving in a horizontal rectilinear path; trough shaped receptacles on said conveyor arranged transversely to its direction of movement, said receptacles being pivotally attached to said conveyor about aligned axes parallel to its direction of movement and normally supported by said conveyor in a horizontal position; means operable to rotate said receptacles from their normal horizontal position to an upright position and back to their normal position, comprising a fixed cam track and means mounted adjacent the hinged ends of said receptacles for engaging said track to rotate said buckets, and an article transfer device operable to deposit articles in said receptacles while in such upright position.

18. In a handling and conveying system a first conveyor adapted to transport articles in an upright position; a second conveyor parallel to said first conveyor and adapted to transport articles in a horizontal position; a device for transferring articles from said first to said second conveyor while in upright position; and means on said second conveyor enabling it to receive articles in an upright position.

19. In an article handling and conveying system, a conveyor moving in a horizontal rectilinear path; a plurality of trough shaped receptacles on said conveyor arranged transversely to its direction of movement, said receptacles being each pivotally mounted at one end on said conveyor about aligned axes parallel to the direction of conveyor movement and normally supported by said conveyor in a horizontal position; means operable to rotate each of said receptacles from its normal horizontal position to an upright position and back to its normal position as it is moved by said conveyor; and an article transfer device operable to deposit articles in said receptacles while in such upright position.

20. In a conveyor, a pair of spaced parallel endless elements having a run in a horizontal plane; a transverse member affixed at its ends to said elements; a receptacle arranged transverse to said elements and pivotally mounted at one end to said member about an axis parallel to the direction of movement of said elements and normally supported by said member in a horizontal position; and means operative during a portion of the horizontal run of said elements to rotate said receptacle from its normal horizontal position to an upright position and back to its normal position.

21. The combination as defined in claim 20 wherein said receptacle is mounted for limited reciprocation transversely to the direction of movement of said endless elements and including means operable to shift said receptacle transversely at one end of its stroke prior to its rotation to upright position and to return it to its normal transverse position after its return to horizontal position.

22. In combination, a supply conveyor, a receiving conveyor, an intermediate conveyor disposed between the others, a series of normally transversely disposed receptacles mounted on said intermediate conveyor for movement transversely of said intermediate conveyor between a first position adjacent said supply conveyor and a second position adjacent said receiving conveyor, means for tilting said receptacles for transfer of articles thereto when at said first position, means for transferring articles from said supply conveyor to said receptacles while so tilted, means for then moving said receptacles to said second position for transfer of articles therefrom, and means for transferring articles from said receptacles to said receiving conveyor while in said second position.

23. In combination, two conveyors having portions that move through a transfer station in adjacent relation and at substantially the same linear speed, a series of movable receptacles normally transversely disposed on one of said conveyors, means for supporting a series of upright articles on the other of said conveyors, means at said station for tilting said receptacles toward upright position for receiving articles from said other conveyor, means at said station for transferring articles from said other conveyor to said tilted receptacles, and means for subsequently moving said receptacles back to normal position on said one conveyor.

24. In the combination defined in claim 23, a third conveyor for carrying a series of open sided cartons along said one conveyor after the receptacles have been tilted back to normal position, and means for transferring said articles from said receptacles into said cartons.

JOHN FRANCIS CURRIVAN.

References Cited in the file of this patent

UNITED STATES PATENTS

| Number | Name | Date |
|---|---|---|
| 931,434 | Krummel | Aug. 17, 1909 |
| 1,263,485 | Thornburg | Apr. 23, 1918 |
| 1,325,527 | Mingle | Dec. 23, 1919 |
| 1,422,229 | Sharp | July 11, 1922 |
| 1,524,641 | Mayers | Jan. 27, 1925 |
| 1,696,294 | Crawford | Dec. 25, 1928 |
| 1,765,419 | Goss | June 24, 1930 |
| 1,981,642 | Benoit | Nov. 20, 1934 |
| 2,119,596 | Mintert | June 7, 1938 |
| 2,355,597 | Pond | Aug. 8, 1944 |
| 2,355,722 | Goebel | Aug. 15, 1944 |
| 2,436,820 | Nordquist | Mar. 2, 1948 |

FOREIGN PATENTS

| Number | Country | Date |
|---|---|---|
| 657,831 | France | May 28, 1929 |
| 330,261 | Italy | Oct. 9, 1935 |